United States Patent [19]

Heyden et al.

[11] Patent Number: 5,519,264
[45] Date of Patent: May 21, 1996

[54] INRUSH CURRENT LIMITER

[75] Inventors: Christopher A. Heyden, Belmont; Donald R. Watson, Haverhill, both of Mass.

[73] Assignee: EMC Corporation, Hopkinton, Mass.

[21] Appl. No.: 410,404

[22] Filed: Mar. 27, 1995

Related U.S. Application Data

[63] Continuation of Ser. No. 984,351, Dec. 2, 1992, abandoned.

[51] Int. Cl.$^6$ ...................................................... H02H 9/00
[52] U.S. Cl. .......................... 307/125; 307/135; 323/908; 361/57; 361/58; 361/93; 361/94
[58] Field of Search ................................... 307/125, 135; 323/908; 361/57, 58, 93, 94, 106

[56] References Cited

U.S. PATENT DOCUMENTS

| 3,656,025 | 4/1972 | Roveti | 317/20 |
|---|---|---|---|
| 3,748,534 | 7/1973 | Jones | 361/17 |
| 3,753,079 | 8/1973 | Trilling | 323/4 |
| 3,909,676 | 9/1975 | McConnell | 317/74 |
| 3,927,350 | 12/1975 | McConnell | 317/11 C |
| 3,935,511 | 1/1976 | Boulanger et al. | 317/20 |
| 4,122,312 | 10/1978 | Glenn | 179/16 F |
| 4,176,385 | 11/1979 | Dethlefsen | 361/58 |
| 4,208,708 | 6/1980 | Abraham et al. | 361/58 |
| 4,217,503 | 8/1980 | Hugel et al. | 307/237 |
| 4,371,859 | 2/1983 | Sorimachi | 337/365 |
| 4,400,670 | 8/1983 | Mostosi | 335/6 |
| 4,418,245 | 11/1983 | Le Grand | 179/2.51 |
| 4,424,478 | 1/1984 | Bukhshtaber et al. | 322/63 |
| 4,438,474 | 3/1984 | Paice | 361/58 |
| 4,503,365 | 3/1985 | Kirk | 361/58 |
| 4,527,270 | 7/1985 | Sweeton | 371/11 |
| 4,551,637 | 11/1985 | Buck et al. | 307/308 |
| 4,586,011 | 4/1986 | Mostosi | 335/6 |
| 4,600,977 | 7/1986 | Barlian et al. | 362/362 |
| 4,714,974 | 12/1987 | Schreurs et al. | 361/12 |
| 4,727,318 | 2/1988 | Sakai et al. | 324/158 T |
| 4,775,864 | 10/1988 | Herman | 340/825.5 |
| 4,803,485 | 2/1989 | Rypinski | 340/325.05 |
| 4,835,737 | 5/1989 | Herrig et al. | 364/900 |
| 4,858,054 | 8/1989 | Franklin | 361/57 |
| 4,905,230 | 2/1990 | Madge et al. | 370/85.5 |
| 4,926,466 | 5/1990 | Ayello et al. | 379/143 |
| 4,940,969 | 7/1990 | Taylor | 340/653 |
| 4,943,691 | 7/1990 | Mertz et al. | 200/151 |
| 4,956,836 | 9/1990 | Beatwright | 378/16.1 |
| 4,999,787 | 3/1991 | McNally et al. | 364/514 |
| 5,000,531 | 3/1991 | Burberry | 350/96.16 |
| 5,021,914 | 6/1991 | Tsurunaga et al. | 361/19 |
| 5,157,771 | 10/1992 | Losi et al. | 395/325 |
| 5,187,653 | 2/1993 | Lorenz | 323/908 |
| 5,210,855 | 5/1993 | Bartol | 395/500 |
| 5,221,888 | 6/1993 | Moody | 323/315 |
| 5,283,707 | 2/1994 | Conners et al. | 361/58 |

Primary Examiner—William M. Shoop, Jr.
Assistant Examiner—Peter Ganjoo
Attorney, Agent, or Firm—Weingarten, Schurgin, Gagnebin & Hayes

[57] ABSTRACT

A method and apparatus for preventing current inrush upon the application of power to a load includes the steps of applying a first increasing DC voltage from a voltage source to the load through a negative temperature coefficient device having a first terminal coupled to the voltage source and a second terminal coupled to the load and after a preselected period of time, bypassing said first and second terminals via a bypass circuit and coupling the increasing voltage to the load through the bypass circuit.

18 Claims, 4 Drawing Sheets

INRUSH CURRENT LIMITER

This application is a continuation of application Ser. No. 07/984,351, filed Dec. 2, 1982, now abandoned.

FIELD OF THE INVENTION

This invention relates to current limiting circuits and more particularly to current limiting circuits for hot-pluggable devices.

BACKGROUND OF THE INVENTION

As is known in the art, there exists a trend in computer and other types of systems to provide fault-tolerant and redundant circuits. In such systems, when a circuit board or a circuit component fails and thus requires replacement, it is often desirable to replace the circuit board or circuit component without removing the operating power from the system. Thus, in these cases, it is necessary to remove the faulty board or circuit component from the system while the system is still operating and in a similar manner it is necessary to install a repaired or a new circuit board or circuit component into the system which already has power being provided thereto.

That is, the replacement circuit board or circuit component is inserted into a so-called "live" or "hot" system. One problem with removing and installing circuit boards and circuit components into such systems is the occurrence of a large current spike which results from the removal or installation of the circuit board or circuit component. Such current spikes often cause the system power to drop to an unacceptable level.

For example, when a replacement printed circuited board provides a large capacitance to the system power supply, the system power supply initially views the impedance as a short circuit impedance. This results in the above-mentioned current spike with the resultant drop of the supply voltage due to the inability of the power supply to source the necessary current. As electrical charge collects due to the capacitive impedance, the current decreases until a steady state current is reached and the power supply voltage returns to its nominal level. Such voltage drops, however, may affect other circuit components and devices within the system since they may be below the minimum voltage levels required by the devices. Thus, it would be desirable to provide a circuit which prevents high currents from flowing into any device or printed circuit board when such a device or printed circuit board is installed into a powered-up system.

SUMMARY OF THE INVENTION

In accordance with the present invention, a current limiting circuit includes a first signal path coupled between a source and a load. Disposed in the first signal path is a first circuit element having a resistance characteristic which decreases in response to increasing temperature and having a first terminal coupled to a voltage source and a second terminal coupled to a load through a first switching device. A control terminal of the switching device is coupled to a first output terminal of a driver circuit and an input terminal of the driver circuit is coupled to the voltage source. The current limiting circuit further includes a second signal path coupled between the source and load wherein the second signal path is coupled in parallel with at least a portion of the first signal path. Disposed in the second signal path are a pair of parallel connected switching devices, each of the switching devices having a control terminal coupled to a second output terminal of the driver circuit through a time delay circuit. With this particular arrangement, a current limiting circuit which may be disposed on a printed circuit board to be installed into a powered up system is provided. When power is applied to the printed circuit board, the driver circuit begins charging an internal charge pump. The driver circuit provides an output voltage to the first switching device. When the switching device is provided as a first switching transistor, the driver circuit output voltage biases the first switching transistor into its conducting state. When the first transistor is biased into its conducting state, a voltage coupled to the input terminal of the current limiting circuit is provided to the load through the first circuit element which may be provided as a thermistor for example. The thermistor initially presents resistance to the voltage which prevents a large amount of current from passing instantaneously therethrough. Thus, the current through the thermistor is initially limited. However, as current passes through and heats the thermistor, the internal resistance of the thermistor decreases. The driver circuit also provides a voltage to the time delay circuit. The time delay circuit provides a time delay before the voltage fed to the control terminals of the pair of switching devices biases the devices such that the devices provide low impedance current paths. Thus, the second signal path initially has a high impedance characteristic relative to the first signal path. After a predetermined amount of time however, the switching devices are biased to provide the second signal path having a relatively low resistance characteristic between the voltage source and the load. In accordance with a further aspect of the present invention, a method of preventing current inrush includes the steps of applying a first increasing DC voltage to a load through a negative temperature coefficient device having first and second electrical connections and, after a preselected period of time, bypassing the negative temperature coefficient device via a bypass circuit and coupling the increasing voltage to the load through the bypass circuit. With this particular arrangement when the load is coupled to a circuit having the negative temperature coefficient device, the current to the load is initially limited by the resistance characteristics of the negative temperature coefficient device and thus large current surges are prevented from being transferred to the load. After the preselected period of time the current may be provided to the load through the bypass circuit.

BRIEF DESCRIPTION OF THE DRAWINGS

The foregoing features of this invention as well as the invention itself may be more fully understood from the following detailed description of the drawings in which.

DESCRIPTION OF THE PREFERRED EMBODIMENTS

Figure 1:
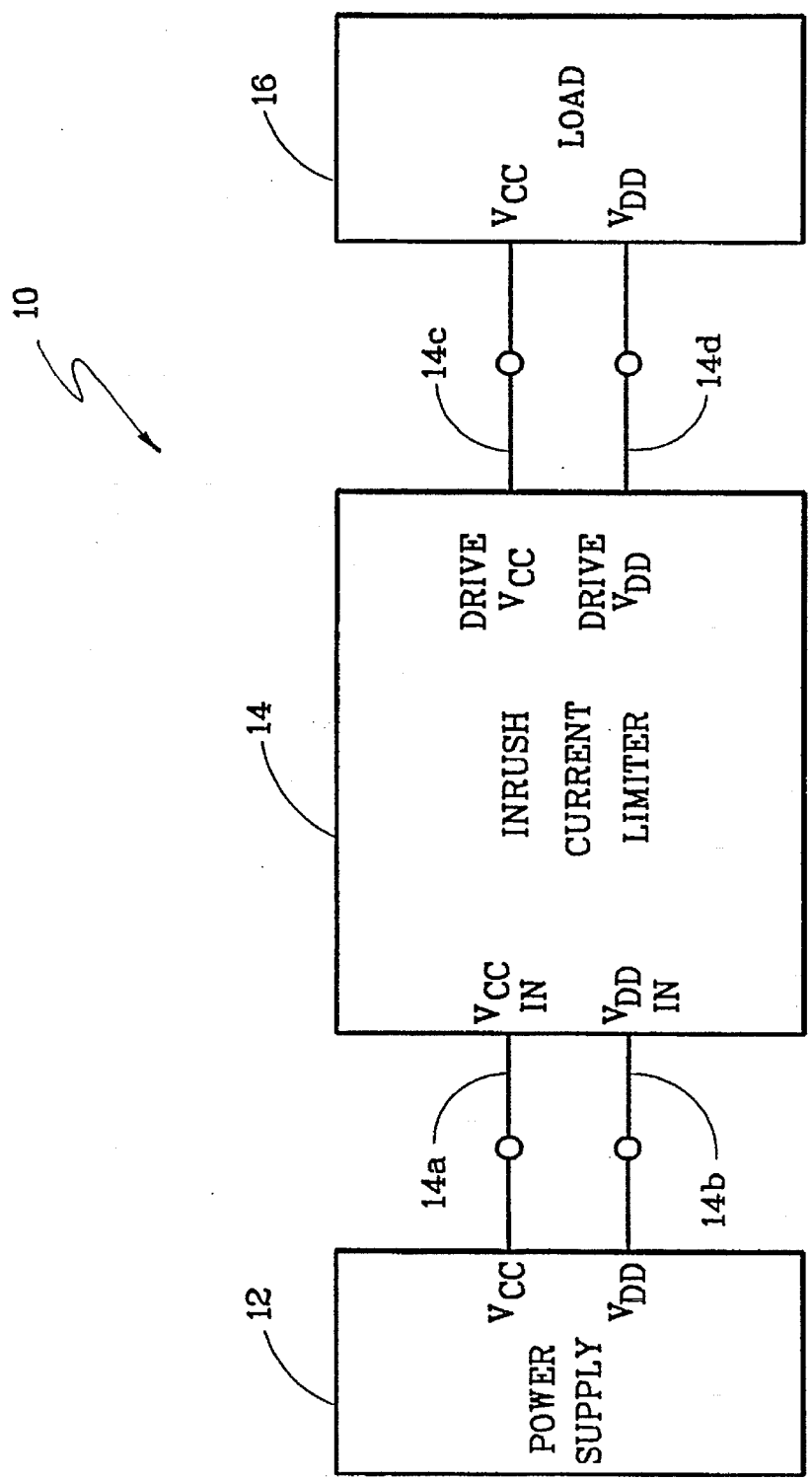
FIG. 1 is a block diagram of a system using the inrush current limiter of the present invention.

Referring now to FIG. 1, a system 10 includes a power supply 12 having a pair of output terminals coupled to a pair of input terminals 14a, 14b of a current limiter circuit 14. The current limiter circuit 14 couples the power supply 12 to a load 16 which may be provided, for example, as a disk drive.

Figure 2:
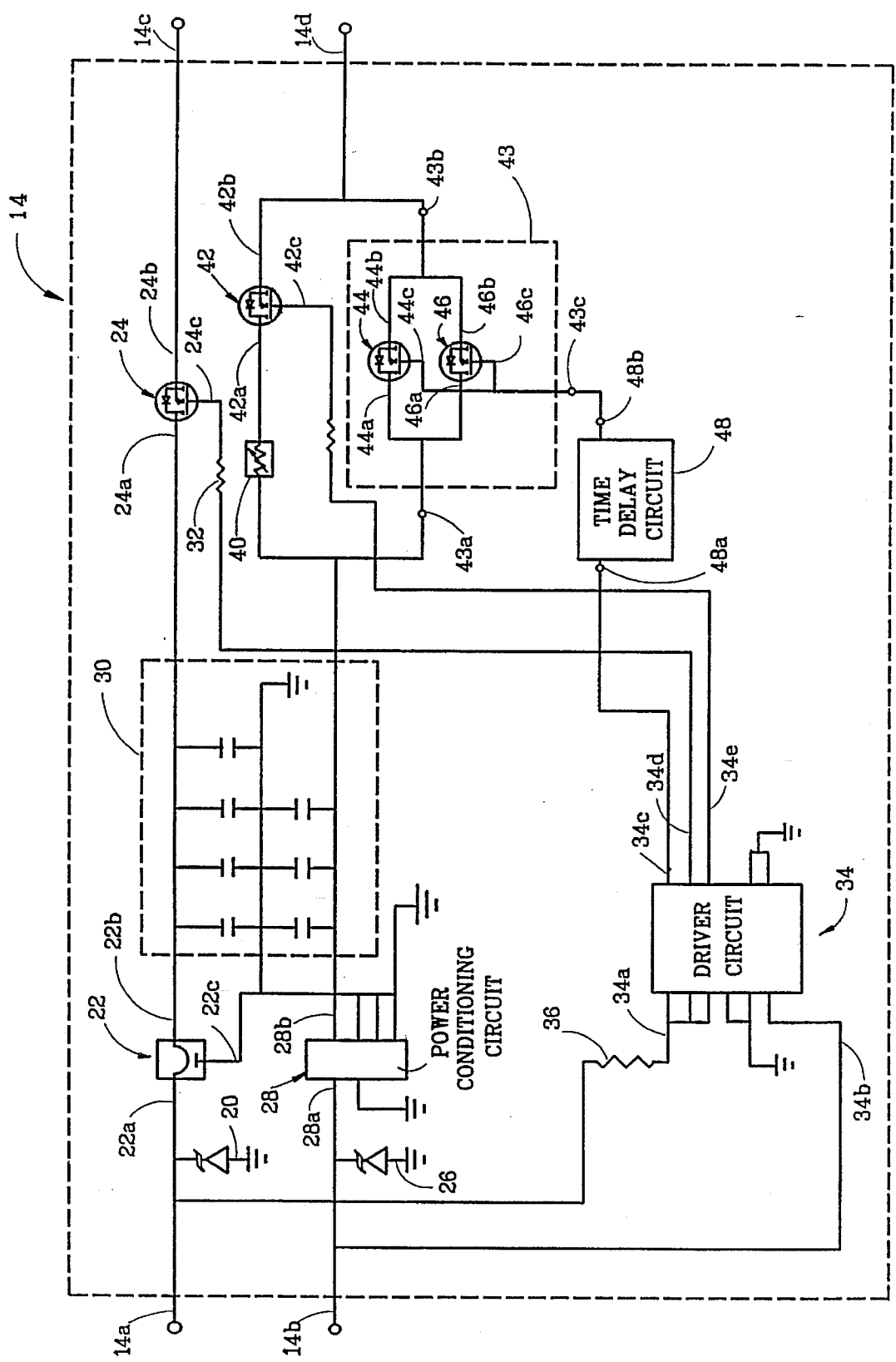
FIG. 2 is a schematic diagram of a first embodiment of an inrush current limiter circuit which may be used in the system of FIG. 1.

Referring now to FIG. 2, a current limiter circuit 14 having a pair of input terminals 14a, 14b and a pair of output terminals 14c, 14d includes a first zener diode 20 having a first terminal coupled to the input terminal 14a and a second terminal coupled to ground. An input terminal 22a of power conditioning circuit 22 is also coupled to the input terminal 14a. An output terminal 22b of the power conditioning circuit 22 is coupled to a source terminal 24a of a metal oxide semiconductor field effect transistor (MOSFET) 24 through a filter circuit 30. A drain terminal 24b of the transistor 24 is coupled to the output terminal 14c of the current limiting circuit 14.

A second zener diode 26 is coupled to the input terminal 14b and a second power conditioning circuit 28 is likewise coupled to the input terminal 14a. The power conditioning circuits 22 and 28 each have input voltages fed thereto from the respective input terminals 14a and 14b and provide at their respective output terminals 22b, 28b a regulated and filtered direct current (DC) voltage.

The filter circuit 30 is coupled to the output ports of each of the power conditioning circuits to further filter the voltage provided at the output terminals of the power conditioning circuits 22, 28. The filter circuit 30 here includes a plurality of capacitors C1–C8 coupled between a signal path and ground as is generally known. Other filtering circuits and techniques may also be employed.

A voltage dropping resistor 32 is coupled between a gate terminal 24C of the transistor 24 and an output terminal 34b of a driver circuit 34. A pair of input terminals 34a, 34b of the driver circuit 34 are coupled to corresponding ones of the pair of input terminals 14a and 14b. Here, a resistor 36 is coupled between the input terminal 14a and the driver circuit input terminal 34a.

The output terminal 28b of the power conditioning circuit 28 is coupled via the filter 30 to the first terminal of a first circuit element 40 having a resistance characteristic which decreases in response to increasing temperature. That is, the circuit element 40 is provided having a negative temperature coefficient resistance characteristic. Thus the circuit element 40 may be provided as a thermistor for example.

A second terminal of the circuit element 40 is coupled to a source terminal 42a of an optional transistor 42. A drain terminal 42 of the transistor 42 is coupled to the output terminal 14d of the current limiter circuit 14. A gate terminal 42c of the transistor 42 is coupled to a second output terminal 34e of the driver circuit 34. Thus the circuit element 40 and transistor 42 provide a first signal path between the output terminal 28b of the power conditioning circuit 28 and the inrush current limiter output terminal 14d.

A bypass circuit 43 has a first terminal 43a coupled to the output terminal 28b of the power conditioning circuit 28 and a second terminal 43b coupled to the inrush current limiter output terminal 14d. Thus the bypass circuit 43 provides a second signal path, parallel to the first signal path, between the power conditioning circuit 28 and the output terminal 14d. In the present embodiment, the bypass circuit 43 here includes third and fourth transistors 44, 46 each having a source terminal 44a, 46a coupled to the bypass circuit input terminal 43a. The drain terminals 44b, 44b of the transistors 44 and 46 are coupled to the bypass circuit output terminal 43b. The gate terminals 44c, 46c of the transistors 44 and 46 are coupled to each other and to a control terminal 43c of the bypass circuit 43.

A time delay circuit 48 is coupled between the driver circuit 34 and the bypass circuit 43 with a first terminal 48a of the time delay circuit 48 coupled to a driver circuit output terminal 34c and a second time delay circuit terminal 48b coupled to the bypass circuit control terminal 43c. It should be noted that the time delay circuit may be provided as an analog or digital time delay circuit suitably selected to provide a predetermined time delay.

Figure 2A:
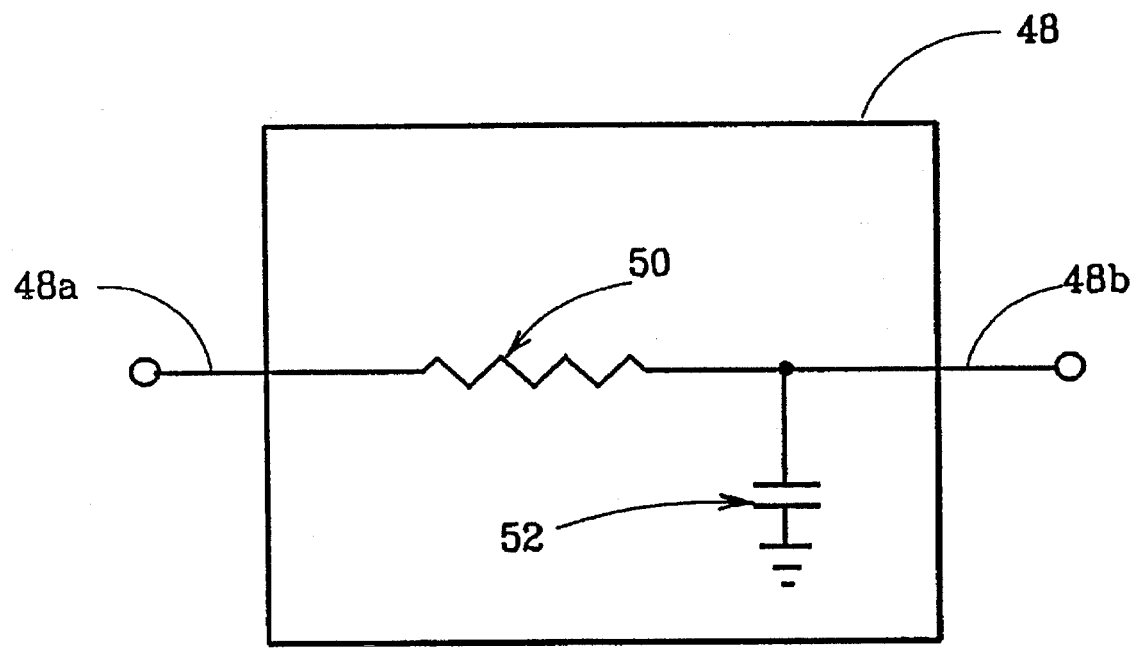
FIG. 2A is a schematic diagram of a time delay circuit which may be used in the inrush current limiter circuit of FIG. 1.

Referring briefly to FIG. 2A, the time delay circuit 48 here includes a first resistor 50 having a first terminal coupled to the first terminal 48a of the time delay circuit 48 and a second terminal coupled to the output terminal of the time delay circuit 48b and a first terminal of a capacitor 52. A second terminal of the capacitor 52 is coupled to ground. Thus, the transistors 44 and 46 have a resistor-capacitor pair coupled to the respective gate terminals 44c, 46c.

Referring again to FIG. 2, when power is applied to the input terminal 14b of the current limiting circuit 14, the driver circuit 34 begins charging an internal charge pump. The driver circuit 34 provides an output voltage on the terminals 34c–34e. When the output voltage on each of the output terminals 34d, 34e reaches a predetermined level, the transistors 24 and 42 are biased into their conducting states.

When transistor 24 is biased into its conducting state, the transistor 24 provides a low impedance signal path between the power conditioning output terminal 28b and the output terminal 14c. Thus, the power applied to the terminal 14a is provided at the output terminal 14c.

When the transistor 42 is placed in its conducting state, the DC voltage provided at the input terminal 14b is coupled to the output terminal 14d of the circuit 14. The circuit 40 having a first impedance level, for example 15 ohms, allows a first predetermined amount of current to flow between the terminals 40a and 40b. As current flows through the circuit 40 and causes heating to occur within the circuit 40, the internal resistance of the circuit 40 decreases. After a predetermined amount of time, the resistance of the circuit 40 may decrease due to the heating to approximately 1.5 ohms for example. Thus, the first resistance of the circuit 40 initially prevents a large amount of current from passing instantaneously therethrough and limits the current. Thereafter, as the temperature of the circuit 40 increases and the resistance decreases, the amount of current which may pass through the circuit 40 increases.

The time delay circuit 48 coupled to the gate terminals 44c, 46c of the transistors 44 and 46 prevents the transistors from being immediately biased into their conducting states. The transistors 44, 46 thus initially provide a high impedance signal path between the terminals 43a and 43b. Thus, the time delay circuit 48 provides the time necessary for the circuit 40 to initially limit the current flow between the terminals 14b and 14d. After this predetermined amount of time, the voltage level at the terminal 14d reaches homeostasis. For example, if the voltage were being provided to a disk drive, this voltage may typically be about 8 volts.

When the voltage level provided to the gate terminals 44c, 46c of the transistors 44 and 46 via the time delay circuit 48 reaches a predetermined level, the transistors 44 and 46 are biased in their low impedance states and the power supply 12 (FIG. 1) coupled to the terminal 14b is coupled to the output terminal 14d via a low resistance path provided by the parallel connected transistors 44 and 46. This resistance, for example, may be on the order of $20 \times 10^{-3}$ ohms. Thus, substantially all of the current will flow through the second signal path provided by the bypass circuit 43.

The transistors 44, 46 are preferable selected having substantially the same electrical characteristics. Thus, when the voltage level is provided to the gate terminals 44c, 46c the transistors 44, 46 are biased into their conducting states at substantially the same time. Furthermore by providing the transistors 44, 46 having the same electrical characteristics, each transistor 44, 46 provides a circuit path having a resistance value such that the current will split evenly between the two circuit paths provided by transistors 44, 46. Furthermore, the transistors 44, 46 are preferably selected having a low forward bias resistance to thus provide a low impedance signal path and minimize the amount of current which may flow along a circuit path provided by the circuit 40.

In some applications it may be desirable to provide the transistors 42, 44, 46 as bipolar junction transistors (BJT) have emitter, base and collector terminals. In the case where the transistors 42, 44, 46 are provided as BJTs, the terminals 42a–46a may correspond to emitter terminals of the BJTs, terminals 42b–46b may correspond to collector terminals of the BJT and terminals 42c–46c may correspond to base terminals of the BJT.

Figure 3:
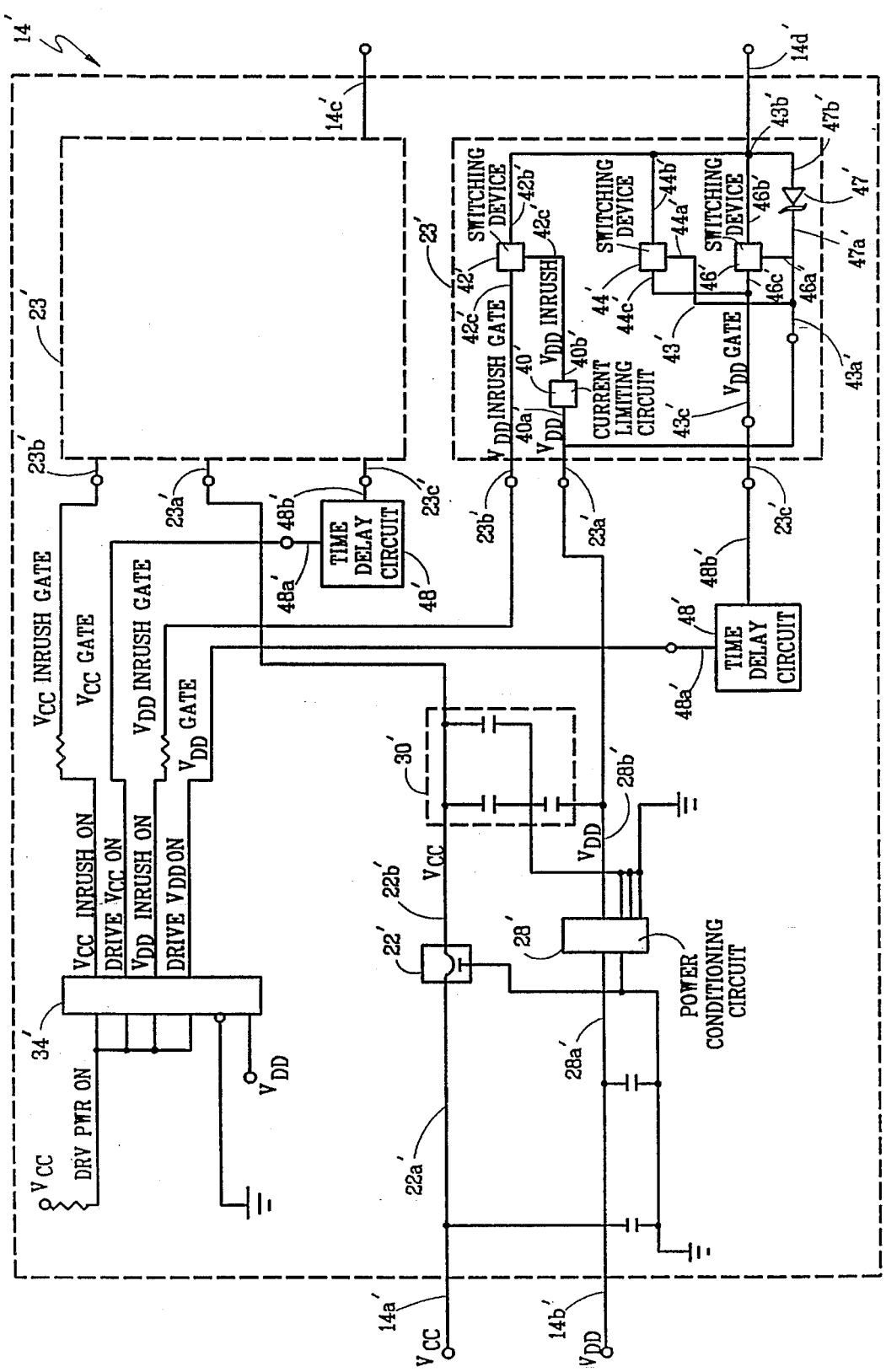
FIG. 3 is a schematic diagram of a second embodiment of an inrush current limiter circuit which may be used in the system of FIG. 1.

Referring now to FIG. 3, a current limiter circuit 14' having a pair of input terminals 14a', 14b' and a pair of output terminals 14c', 14d' includes a power conditioning circuit 22' having an input terminal 22a' coupled to the input terminal 14a'. An output terminal 22b' of the power conditioning circuit 22' is coupled to an input terminal 23a' of a first a current limiting circuit 23'. The operation of the of the current limiting circuit 23' will be described further below. Suffice it here to say that the circuit 23' couples voltage fed thereto at input terminal 23a' to the output terminal 14c'.

A second power conditioning circuit 28' is coupled to the input terminal 14a'. The power conditioning circuits 22' and 28' operate in the same manner as circuits 22 and 28 described in conjunction with FIG. 1 above to provide regulated and filtered direct current (DC) voltage at the output terminals 22b', 28b'.

A filter circuit 30' is coupled to the output ports 22b', 28b' of each of the power conditioning circuits 22', 28' to further filter the voltage provided at the output terminals of the power conditioning circuits 22', 28'.

The output terminal 28b' of the power conditioning circuit 28' is coupled via the filter 30' to a first terminal 23a' of a second current limiting circuit 23'. Each of the current limiting circuits 23' includes a current limiting circuit element 40' having a first terminal 40a' coupled to an input terminal 23a' of the circuit 23' and having a second terminal 40b' coupled to an input terminal 42a' of an optional switching device 42'.

The circuit element 40' may be provided as an inductor having a predetermined inductance selected to limit current of a signal provided thereto. Alternatively the circuit element may be provided as a resistor having a predetermined resistance selected to limit the current of a signal provided thereto. The circuit element 40' may also be provided having a resistance characteristic which decreases in response to increasing temperature. That is, the circuit element 40' may be provided having a negative temperature coefficient resistance characteristic. Thus the circuit element 40' may be provided as a thermistor for example.

A second terminal 42b' of the switching device 42' is coupled to the output terminal 14d' of the current limiter circuit 14'. A control terminal 42c' of the switching device 42' is coupled to a second input terminal 23b' of the current limiting circuit 23' and is subsequently coupled to an output terminal of a driver circuit 34'. Thus the circuit element 40' and the switching device 42' provide a first signal path between the output terminal 28b' of the power conditioning circuit 28' and the inrush current limiter output terminal 14d'.

A bypass circuit 43' has a first terminal 43a' coupled to the output terminal 28b' of the power conditioning circuit 28' and a second terminal 43b' coupled to the inrush current limiter output terminal 14d'. Thus the bypass circuit 43' provides a second signal path, parallel to the first signal path, between the power conditioning circuit 28' and the output terminal 14d'. In the present embodiment, the bypass circuit 43' here includes third and fourth switching devices 44', 46' each having a first terminal 44a', 46a' coupled to the bypass circuit input terminal 43a'. A second terminal 44b', 46b' of the switching devices 44', 46' are coupled to bypass the circuit output terminal 43b'. A control terminal 44c', 46c' of each of the switching devices 44', 46' are coupled to each other and to a control terminal 43c of the bypass circuit 43'.

An cathode 47a' of a current limiting diode 47' is coupled to the terminals 44a', 46a' of the switching devices 44', 46' and an anode 47b' of the diode 47' is coupled to the terminals 44b', 46b'.

A time delay circuit 48' is coupled between the driver circuit 34' and the bypass circuit 43' with a first terminal 48a' of the time delay circuit 48' coupled to a driver circuit output terminal 34c and a second time delay circuit terminal 48b' coupled to the bypass circuit control terminal 43c. As mentioned above in conjunction with FIG. 1, the time delay circuit 48' may be provided as an analog or digital time delay circuit selected to provide a suitable time delay.

Each of the switching devices 42', 44' and 46' may be provided as any circuit element including but not limited to field effect transistors, bipolar junction transistors, diodes, a mechanical relay or any other circuit element capable of providing a signal path having a selectively high impedance characteristic or a selectively low impedance characteristic.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the appended claims.

What is claimed is:

1. A hot pluggable circuit for limiting the inrush current from a source to a load, said hot pluggable circuit having a first input terminal adapted to couple to the source and an output terminal adapted to couple to the load, the hot pluggable circuit comprising:

a circuit element having first and second electrical connections wherein said circuit element has a resistance characteristic which decreases with increasing temperature, said first electrical connection of said circuit element being coupled to the first input terminal of the hot pluggable circuit and said second electrical connection of said circuit element being coupled to the output terminal of the hot pluggable circuit; and a solid state device having an input connection and an output connection and having a high impedance state and a low impedance state, said input connection of said solid state device being coupled to said first electrical connection of said circuit element and said output connection of said solid state device being coupled to said second electrical connection of said circuit element, said solid state device being activatable to switch from said high impedance state to said low impedance state a preselected period of time after the application of voltage from the source to the first input terminal of the hot pluggable circuit.

2. The circuit of claim 1 wherein said solid state device comprises a field effect transistor, having a source, a gate, and a drain, and the input connection is the transistor source, the output connection is the transistor drain and the transistor is activatable by applying a control voltage to the transistor gate.

3. A method of preventing current inrush from a voltage source to a load with a hot pluggable circuit having an input terminal adapted to couple to the voltage source and an output terminal adapted to couple to the load, the method comprising the steps of:

applying a first increasing DC voltage from the voltage source to the load through a negative temperature coefficient device having a first terminal coupled to the input terminal of the hot pluggable circuit and a second terminal coupled to the output terminal of the hot pluggable circuit; and after a preselected period of time, bypassing the first and second terminals of said negative temperature coefficient device via a solid state device and coupling the increasing voltage to the output terminal of the hot pluggable circuit through said solid state device.

4. The method of claim 3 wherein said bypassing step comprises the step of activating said solid state device such that said solid state device provides a signal path between said first and second terminals wherein said signal path has an impedance lower than an impedance between the first and second terminals of said temperature coefficient device.

5. The method of claim 4 wherein said solid state device is connected in parallel with said negative temperature coefficient device between the voltage source and the load.

6. A hot pluggable current limiting circuit for coupling a disk drive to an operating power supply, the hot pluggable current limiting circuit having a first input terminal adapted to couple to the power supply and an output terminal adapted to couple to the disk drive, the hot pluggable current limiting circuit comprising:

a driver circuit having an input terminal coupled to the first input terminal of the hot pluggable current limiting circuit;

a circuit element having a first terminal coupled to the first input terminal of the hot pluggable current limiting circuit and a second terminal coupled to the output terminal of the hot pluggable current limiting circuit, said circuit element having a resistance characteristic which decreases in response to increasing temperature;

a first switching device having a first terminal coupled to the first terminal of said circuit element, a second terminal coupled to the output terminal of the hot pluggable current limiting circuit and a third terminal; and a time delay circuit having a first terminal coupled to the third terminal of the first switching device and a second terminal coupled to a first output terminal of said driver circuit wherein said time delay circuit provides a time delay before said first switching device provides a low resistance path between the first input terminal of the hot pluggable current limiting circuit and the output terminal of the hot .pluggable current limiting circuit.

7. The current limiting circuit of claim 6 further comprising:

a second switching device having a first terminal coupled to the second terminal of said circuit element, a second terminal coupled to an output terminal of the hot pluggable current limiting circuit and a third terminal coupled to a second output terminal of said driver circuit; and a third switching device having a first terminal coupled to the first input terminal of the hot pluggable current limiting circuit, a second terminal coupled to the output terminal of the hot pluggable current limiting circuit and a third terminal coupled to the first terminal of said time delay circuit.

8. The current limiting circuit of claim 7 wherein said time delay circuit comprises:

a first resistor having a first terminal coupled to the first terminal of said time delay circuit and a second terminal coupled to the second terminal of said time delay circuit; and a capacitor having a first terminal coupled to the first terminal of said time delay circuit and a second terminal coupled to a first reference potential.

9. The current limiting circuit of claim 8 further comprising a fourth switching device having a first terminal coupled to a second input terminal of the hot pluggable current limiting circuit, a second terminal coupled to a second output terminal of the hot pluggable current limiting circuit and a third terminal coupled to a third output terminal of said driver circuit.

10. A hot pluggable current limiting circuit having a first input terminal adapted to couple to a voltage source and an output terminal adapted to couple to a load, the hot pluggable current limiting circuit comprising:

a driver circuit having an input terminal coupled to the first input terminal of the hot pluggable current limiting circuit;

a circuit element having a first terminal coupled to the first input terminal of the hot pluggable current limiting circuit and a second terminal coupled to the output terminal of the hot pluggable current limiting circuit, said circuit element having a resistance characteristic which decreases in response to increasing temperature;

a first switching device having a first terminal coupled to the first terminal of said circuit element, a second terminal coupled to the output terminal of the hot pluggable current limiting circuit and a third terminal; and a time delay circuit having a first terminal coupled to the third terminal of the first switching device and a second terminal coupled to a first output terminal of said driver circuit wherein said time delay circuit provides a time delay before said first switching device provides a low resistance path between the input terminal of said current limiting circuit and the output terminal of the current limiting circuit.

11. The hot pluggable current limiting circuit of claim 10 further comprising:

a second switching device having a first terminal coupled to the second terminal of said circuit element, a second terminal coupled to an output terminal of the hot pluggable current limiting circuit and a third terminal coupled to a second output terminal of said driver circuit; and a third switching device having a first terminal coupled to the first input terminal of the hot pluggable current limiting circuit, a second terminal coupled to the output terminal of the hot pluggable current limiting circuit and a third terminal coupled to the first terminal of said time delay circuit.

12. The hot pluggable current limiting circuit of claim 11 wherein said time delay circuit comprises:

a first resistor having a first terminal coupled to the first terminal of said time delay circuit and a second terminal coupled to the second terminal of said time delay circuit; and a capacitor having a first terminal coupled to the first terminal of said time delay circuit and a second terminal coupled to a first reference potential.

13. The hot pluggable current limiting circuit of claim 12 further comprising a fourth switching device having a first terminal coupled to a second input terminal of the hot pluggable current limiting circuit, a second terminal coupled to a second output terminal of the hot pluggable current limiting circuit and a third terminal coupled to a third output terminal of said driver circuit.

14. The current limiting circuit of claim 13 wherein each of said first, second, third and fourth switching devices is a field effect transistor.

15. A hot pluggable current limiting circuit having a pair of input terminals and a pair of output terminals, the hot pluggable current limiting circuit comprising:

a driver circuit having a pair of input terminals and three output terminals wherein a first one of said pair of input terminals of said driver circuit is coupled to a first one of the pair of input terminals of the hot pluggable current limiting circuit and a second one of said pair of input terminals of said driver circuit is coupled to a second one of the pair of input terminals of the hot pluggable current limiting circuit;

a first transistor having a first terminal coupled to the first one of the pair of input terminals of the hot pluggable current limiting circuit, a second terminal coupled to a first one of the pair of output terminals of the hot pluggable current limiting circuit and a third terminal coupled to a first one of the three output terminals of said driver circuit;

a second transistor having a first terminal coupled to the first one of the pair of input terminals of the hot pluggable current limiting circuit, a second terminal coupled to a first one of the pair of output terminals of the hot pluggable current limiting circuit and a third terminal coupled to a first one of the three output terminals of said driver circuit;

a third transistor having a first terminal coupled to the first one of the pair of input terminals of the hot pluggable current limiting circuit, a second terminal coupled to a first one of the pair of output terminals of the hot pluggable current limiting circuit and a third terminal coupled to a first one of the three output terminals of said driver circuit;

a fourth transistor having a first terminal coupled to the first one of the pair of input terminals of the hot pluggable current limiting circuit, a second terminal coupled to a first one of the pair of output terminals of the hot pluggable current limiting circuit and a third terminal coupled to a first one of the three output terminals of said driver circuit;

a thermistor having a first terminal coupled to the first terminal of the second transistor and a second terminal coupled to the second input terminal of the hot pluggable current limiting circuit; and a time delay circuit having a first terminal coupled to the third terminal of the third transistor and the third terminal of said fourth transistor and a second terminal coupled to the first output terminal of said driver circuit wherein said time delay circuit provides a time delay before said third and fourth transistors provide a low resistance path between the first output terminal of said driver circuit and the output terminal of the hot pluggable current limiting circuit.

16. The hot pluggable current limiting circuit of claim 15 further comprising:

a first resistor having a first terminal coupled to the third terminal of the first transistor and a second terminal coupled to the second output terminal of said driver circuit; and a second resistor having a first terminal coupled to the third terminal of the second transistor and a second terminal coupled to the third output terminal of said driver circuit.

17. The current limiting circuit of claim 16 wherein said time delay circuit comprises:

a third resistor having a first terminal coupled to the first terminal of said time delay circuit and a second terminal coupled to the second terminal of said time delay circuit; and a capacitor having a first terminal coupled to the first terminal of said time delay circuit and a second terminal coupled to a first reference potential.

18. The current limiting circuit of claim 17 wherein each of said first, second, third and fourth transistors is a field effect transistor.

* * * * *